(12) United States Patent
Ishizuka et al.

(10) Patent No.: US 12,477,404 B2
(45) Date of Patent: Nov. 18, 2025

(54) MANAGEMENT APPARATUS

(71) Applicant: NTT DOCOMO, INC., Chiyoda-ku (JP)

(72) Inventors: Hiroki Ishizuka, Chiyoda-ku (JP); Masashi Anzawa, Chiyoda-ku (JP); Daiki Takeda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 625 days.

(21) Appl. No.: 17/906,643

(22) PCT Filed: Feb. 26, 2021

(86) PCT No.: PCT/JP2021/007379
§ 371 (c)(1),
(2) Date: Sep. 19, 2022

(87) PCT Pub. No.: WO2021/210278
PCT Pub. Date: Oct. 21, 2021

(65) Prior Publication Data
US 2023/0217315 A1 Jul. 6, 2023

(30) Foreign Application Priority Data
Apr. 13, 2020 (JP) ................. 2020-071493

(51) Int. Cl.
*H04W 28/24* (2009.01)
(52) U.S. Cl.
CPC ................... *H04W 28/24* (2013.01)
(58) Field of Classification Search
CPC .................................................. H04W 28/24
See application file for complete search history.

(56) References Cited

U.S. PATENT DOCUMENTS

2012/0058742 A1* 3/2012 Razoumov .......... H04L 41/5041
455/406
2014/0160990 A1 6/2014 Sachdev et al.
(Continued)

FOREIGN PATENT DOCUMENTS

JP 2014-33446 A 2/2014
JP 2014-527771 A 10/2014

OTHER PUBLICATIONS

International Search Report issued May 18, 2021 in PCT/JP2021/007379, filed on Feb. 26, 2021, 4 pages.
(Continued)

*Primary Examiner* — Melvin C Marcelo
(74) *Attorney, Agent, or Firm* — Oblon, McClelland, Maier & Neustadt, L.L.P.

(57) ABSTRACT

A management apparatus includes an obtainer that obtains a start request to request a start of control of quality of a communication service provided to one of a plurality of terminal apparatuses, each of the plurality of terminal apparatuses being connected to one of a plurality of networks managed by a plurality of communication carriers, and terminal information about the terminal apparatus; an identifier that identifies, from among the plurality of communication carriers, a communication carrier that provides the communication service to the terminal apparatus, based on the terminal information; and a service manager that executes predetermined processing for causing a quality control system of the identified communication carrier to start the control of the quality of the communication service to the terminal apparatus.

13 Claims, 7 Drawing Sheets

(56) References Cited

U.S. PATENT DOCUMENTS

| | | |
|---|---|---|
| 2015/0085664 A1 | 3/2015 | Sachdev et al. |
| 2023/0208767 A1* | 6/2023 | Ishizuka ............. H04L 47/2475 370/235 |
| 2023/0308364 A1* | 9/2023 | Ishizuka ................ H04L 67/00 |
| 2023/0308365 A1* | 9/2023 | Ishizuka ................ H04M 3/00 |

OTHER PUBLICATIONS

Notice of Reasons for Refusal issued Nov. 14, 2023 in Japanese Patent Application No. 2022-515234 (with English machine translation), 13 pages.

Japanese Office Action mailed on Apr. 9, 2024 in corresponding Japanese Patent Application No. 2022-515234 (with English translation), 15 pages. All references cited were previously filed on Form PTO-1449 on Sep. 19, 2022.

* cited by examiner

FIG. 2

TBL

| COMMUNICATION CARRIER ID | CARRIER-SPECIFIC INFO (CAinf) ||
|---|---|---|
| | API INFO | ACCESS INFO |
| COMMUNICATION CARRIER A | API INFO A | ADDRESS A |
| COMMUNICATION CARRIER B | API INFO B | ADDRESS B |
| ⋮ | ⋮ | ⋮ |

FIG. 3

| API INFO | • REQUEST TO START QoS CONTROL<br>• REQUEST TO END QoS CONTROL<br>• CONFIRMATION ABOUT STATE OF QoS CONTROL<br>• CONFIRMATION ABOUT AVAILABILITY OF QoS CONTROL<br>• ACQUISITION OF SIM INFO<br>• REQUEST MODE TYPE (QoS LEVEL etc.)<br>• REQUEST NETWORK QUALITY<br>  (THROUGHPUT, LATENCY TIME, JITTER, FRAME RATE, PACKET<br>  LOSS RATE, etc.)<br>• SIM INFO<br>• USER EQUIPMENT INFO<br>• AREA INFO<br>  (POSITION INFO, MAP INFO, BASE STATION INFO, WEATHER<br>  INFO, SURROUNDING OBSTACLE INFO, PRESENCE OR<br>  ABSENCE OF FAILURE NOTIFICATION, etc)<br>• UNIQUE FUNCTION OF COMMUNICATION CARRIER |
|---|---|

FIG. 4

| TERMINAL INFO (TEinf) | SIM INFO | ·IMSI<br>·MSISDN<br>·ICCID<br>·CONTRACT INFO<br>·CONTRACT STATE |
|---|---|---|
| | USER EQUIPMENT INFO | ·IP ADDRESS OF TERMINAL APPARATUS<br>·MODEL NAME OF TERMINAL APPARATUS<br>·APPLICATION INFO<br>  (NAME OF APPLICATION PROGRAM, etc.)<br>·OPPOSITE SERVER INFO<br>·OPPOSITE USER EQUIPMENT INFO<br>·SIGNATURE INFO<br>·PACKAGE INFO<br>·OS INFO<br>·MEMORY INFO<br>·CPU INFO<br>·CAPACITY FACTOR OF CPU<br>·CAPACITY FACTOR OF MEMORY<br>·USER IDENTITY INFO<br>  (FINGERPRINTS, IRIS, FACE, PASSWORDS, etc.) |

FIG. 5

| NETWORK INFO | • 5-TUPLE INFO<br>  (TRANSMITTER IP ADDRESS, DESTINATION IP ADDRESS, TRANSMITTER PORT NUMBER, DESTINATION PORT NUMBER, PROTOCOL ID)<br>• APN<br>• COMMUNICATION SYSTEM INFO<br>  (3G, 4G, 5G, WiFi, TETHERING, WIRED, etc.)<br>• NETWORK QUALITY<br>  (THROUGHPUT, LATENCY TIME, JITTER, FRAME RATE, PACKET LOSS RATE, etc.)<br>• OPERATING RATE<br>• AVAILABILITY<br>• THE NUMBER OF SIMULTANEOUS CONNECTIONS |
|---|---|

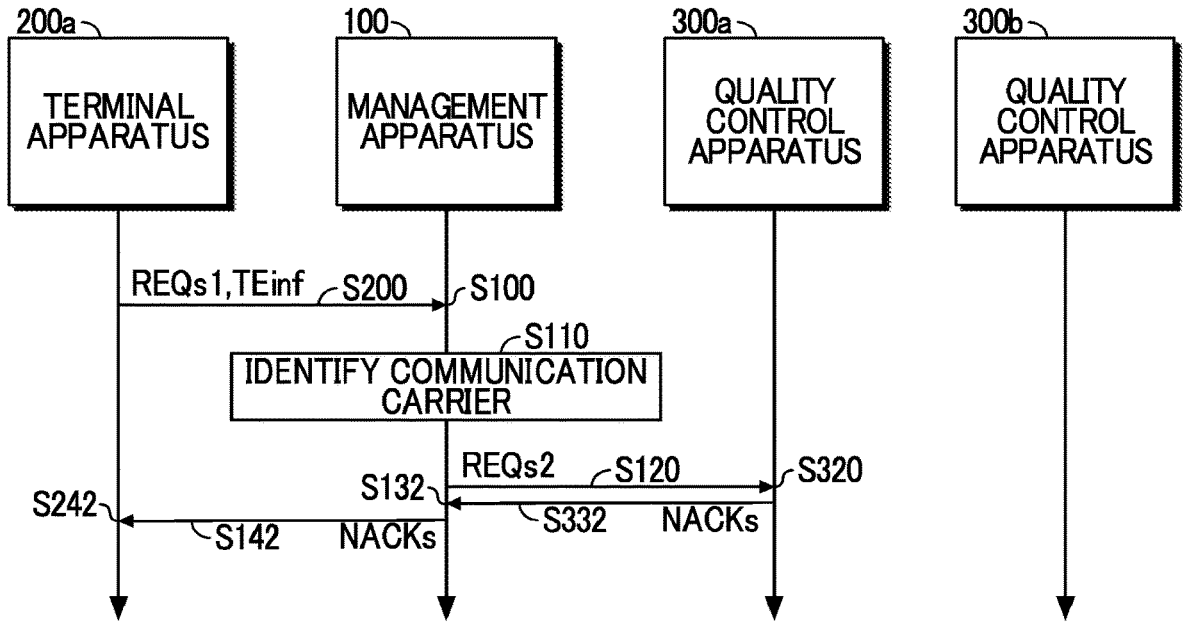
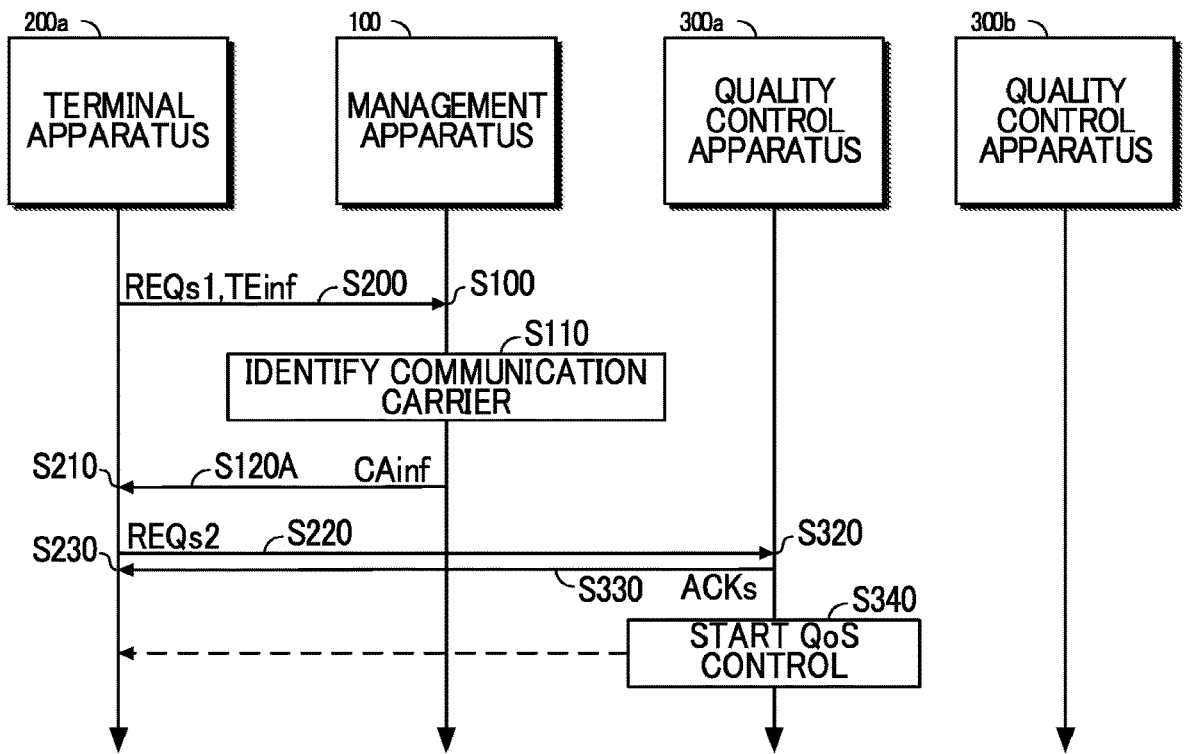

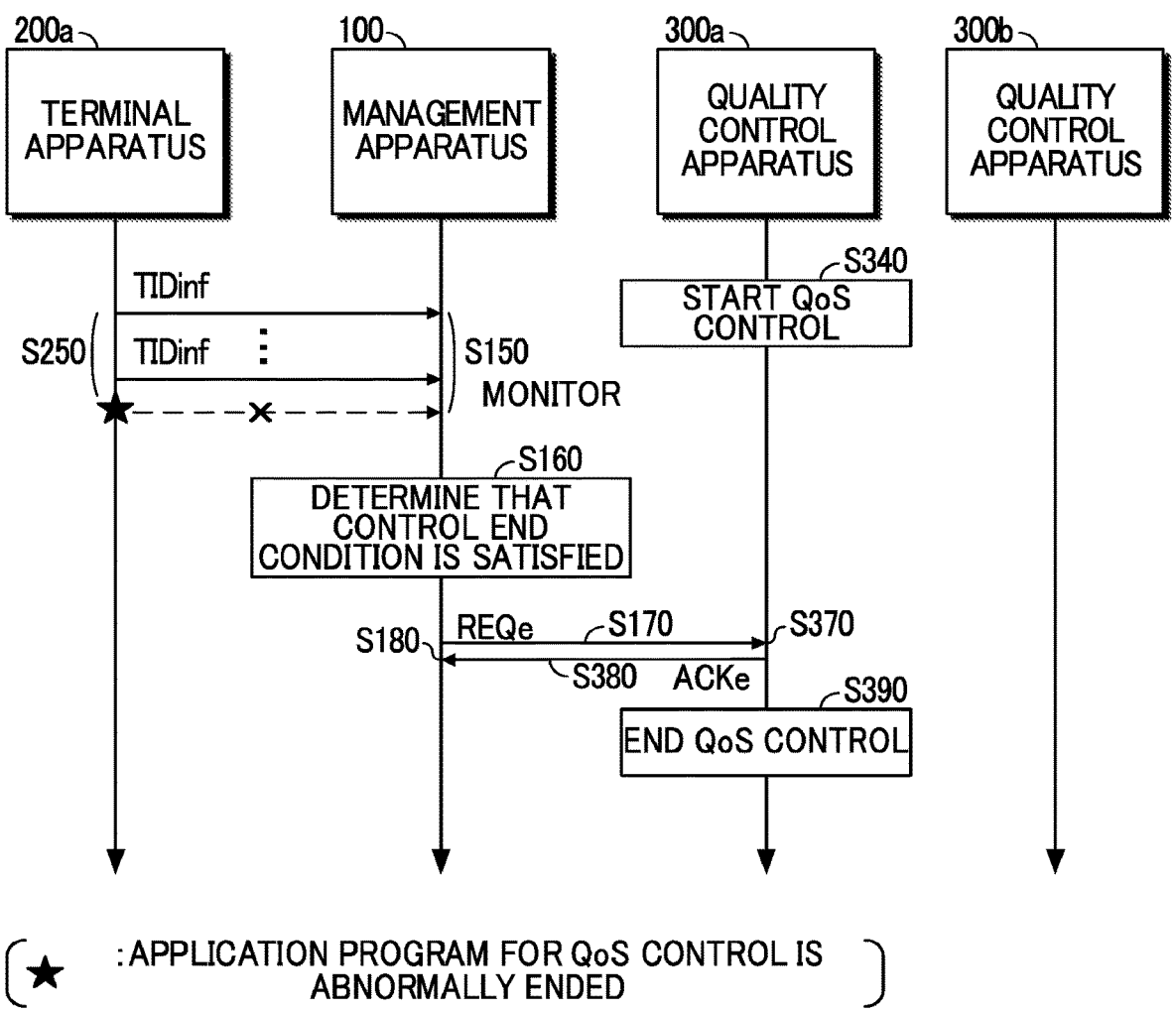

MANAGEMENT APPARATUS

TECHNICAL FIELD

The present invention relates to a management apparatus.

BACKGROUND ART

Quality of Service (QoS) control is known as a technique for enhancing communication quality in a communication system such as a network. For example, in a system in which a terminal apparatus such as a smartphone is connected to a network, a method of executing QoS control in response to a QoS level requested from the terminal apparatus has been proposed (for example, Patent Document 1).

RELATED ART DOCUMENT

Patent Document

Patent Document 1: Japanese Patent Application Laid-Open Publication No. 2014-33446

SUMMARY OF THE INVENTION

Problem to be Solved by the Invention

In a plurality of networks, each of which is managed by one of a plurality of communication carriers, specifications in requesting execution of QoS control (e.g., information to be notified to a network in requesting the execution of the QoS control, an access destination of the request, etc.) may vary depending on a network to be subjected to the QoS control in some cases. Therefore, for example, in a case in which an application carrier that provides an application program to be installed in a terminal apparatus creates an application program such that the execution of the QoS control can be requested to any of the plurality of networks managed by the plurality of communication carriers, the application program becomes complicated, which is problematic.

Means of Solving the Problems

In order to solve the problem described above, a management apparatus according to a preferred aspect of the present invention includes: an obtainer configured to obtain: a start request to request a start of control of quality of a communication service provided to one of a plurality of terminal apparatuses, each of the plurality of terminal apparatuses being connected to one of a plurality of networks managed by a plurality of communication carriers, and terminal information about the terminal apparatus; an identifier configured to identify, from among the plurality of communication carriers, a communication carrier that provides the communication service to the terminal apparatus, based on the terminal information; and a service manager configured to execute predetermined processing for causing a quality control system of the identified communication carrier to start the control of the quality of the communication service to the terminal apparatus.

Effects of the Invention

According to the present invention, in a case in which an application program is to be created that enables a request to be made to any of a plurality of networks managed by a plurality of communication carriers to execute QoS control, it is possible to prevent or reduce the risk of the application program becoming complicated.

BRIEF DESCRIPTION OF THE DRAWINGS

FIG. 2 is an explanatory diagram showing an example of a management table illustrated in FIG. 1.

FIG. 3 is an explanatory diagram showing an example of API information.

FIG. 4 is an explanatory diagram showing an example of terminal information.

FIG. 5 is an explanatory diagram showing an example of network information.

FIG. 7 is a sequence chart showing another example of the operation of the network system illustrated in FIG. 1.

FIG. 8 is a sequence chart showing an example of operation of the network system according to a first modification example.

FIG. 9 is a sequence chart showing an example of operation of the network system according to a second modification example.

MODES FOR CARRYING OUT THE INVENTION

1. Embodiment

Figure 1:
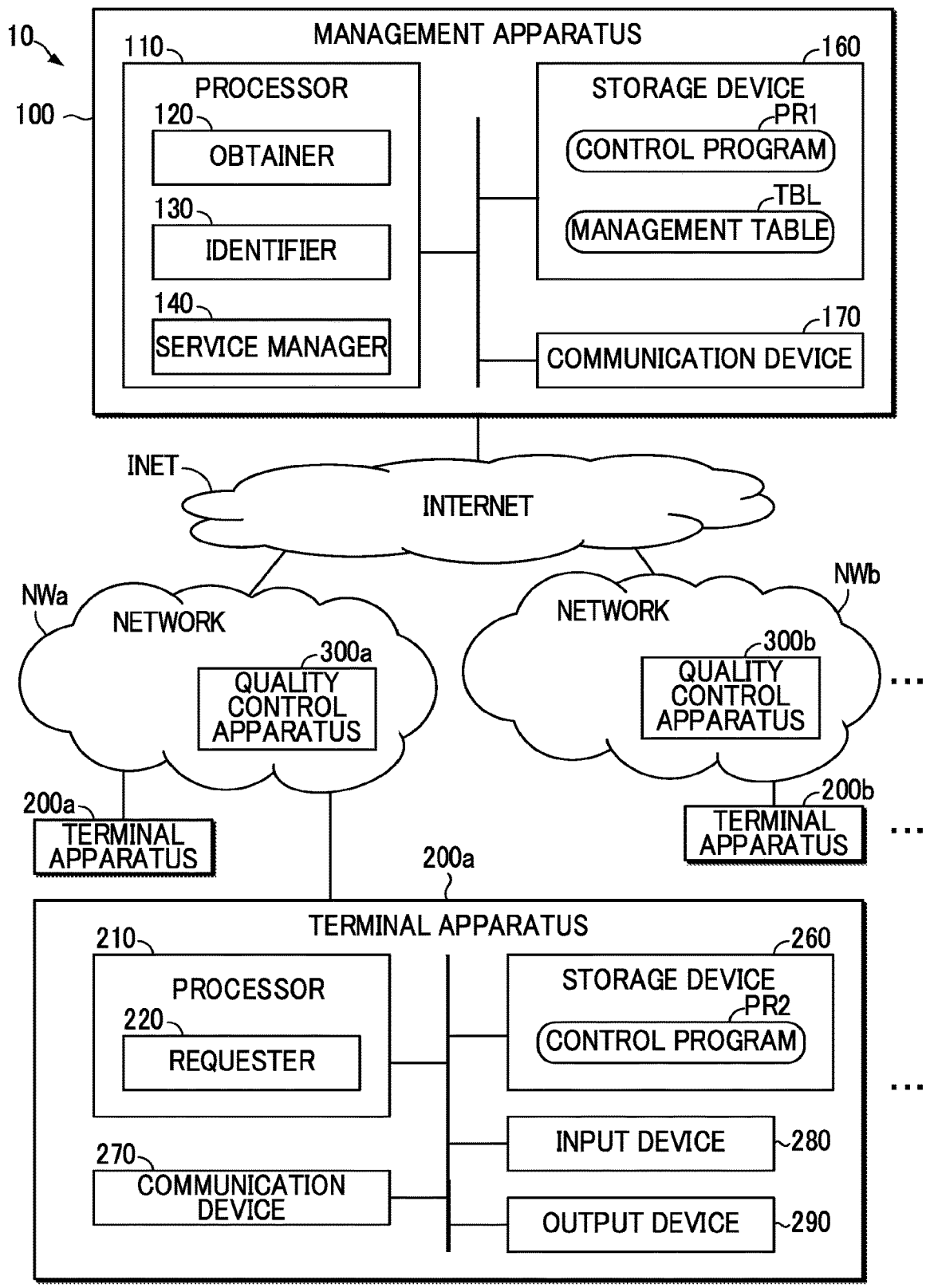
FIG. 1 is a block diagram showing a general configuration of a network system including a management apparatus according to an embodiment.

FIG. 1 is a block diagram illustrating a general configuration of a network system 10 including a management apparatus 100 according to an embodiment. As illustrated in FIG. 1, the network system 10 includes a plurality of networks NW connected to each other via the Internet INET, the management apparatus 100 connected to the plurality of networks NW via the Internet INET, and a plurality of terminal apparatuses 200, each of which is connected to one of the plurality of networks NW. It should be noted that the management apparatus 100 may be connected to the plurality of networks NW without connection via the Internet INET. In the present specification, the term "apparatus" may be replaced with another term such as "circuit", "device", or "unit".

For example, each of the plurality of networks NW is an electronic communication line, such as a mobile communication network, that is managed by each of a plurality of communication carriers each providing a communication service, and includes one or both of a wired network and a wireless network. For example, the management of each network NW includes running the network NW. However, in a case in which the corresponding communication carrier is a virtual mobile communication carrier, for example, the management of the network NW may not include running a wireless station, such as a base station, included in the network NW in some cases and may not include running wired networks in some cases.

Each of the plurality of networks NW includes a quality control apparatus 300. For example, a connection between networks NW, a connection between a network NW and a terminal apparatus 200, and a connection between a network NW and the management apparatus 100 may be established in one of a wired manner and a wireless manner or in both a wired manner and a wireless manner, as long as these connections each allow a plurality of elements to communicate with each other.

It should be noted that as illustrated in FIG. 1, a lower-case alphabet (a or b) is added to the reference sign "NW" of each network in order to distinguish the plurality of networks NW from each other. In addition, the same lower-case alphabet (a or b) as that is used for a network NW is added to the reference sign "300" of a corresponding quality control apparatus included in the network NW and to the reference sign "200" of each terminal apparatus connected to the network NW.

For example, a network NWa is managed by a communication carrier different from a communication carrier that manages a network NWb. For example, a quality control apparatus 300a is included in the network NWa and controls the quality of a communication service related to the network NWa. For example, a quality control apparatus 300b is included in the network NWb and controls the quality of a communication service related to the network NWb. For example, a terminal apparatus 200a is a terminal apparatus 200 connected to the network NWa, and a terminal apparatus 200b is a terminal apparatus 200 connected to the network NWb. For example, a freely selected information processing apparatus can be adopted as the terminal apparatus 200. The terminal apparatus 200 may be a stationary information device, such as a personal computer, or may be a portable information terminal, such as a smartphone, a notebook personal computer, a wearable terminal, or a tablet terminal. It is assumed in the following description that the terminal apparatus 200 is a smartphone.

It is assumed in the present embodiment that control of the quality of the communication service with regard to a network NW to which a plurality of terminal apparatuses 200 are connected is executable for each terminal apparatus 200. In the following, the control of the quality of the communication service is also referred to as Quality of Service (QoS) control. For example, the QoS control includes band control, low latency control, priority control, and the like. For example, the band control controls a communication band in the network NW. The band control may be band assurance by which a lower limit value is set for a band or may be band restriction by which an upper limit value is set for a band. Likewise, for example, the low latency control may be latency assurance by which an upper limit value is set for latency or may be latency restriction by which a lower limit value is set for latency. For example, the priority control preferentially transfers a packet related to a specific communication (data on a transfer basis in performing communications). For example, priorities are given to packets flowing in the network NW, and a packet with a higher priority is processed prior to a packet with a lower priority. In the present embodiment, for example, the QoS control is initiated when a terminal apparatus 200 issues a request to start the QoS control to a quality control apparatus 300 via the management apparatus 100.

For example, the management apparatus 100 is an information processing apparatus, such as a server, which is communicable with a plurality of terminal apparatuses 200 connected to each network NW. In the present embodiment, the management apparatus 100 is communicable also with the respective quality control apparatuses 300 included in the networks NW. In other words, the network system 10 includes the management apparatus 100 that does not depend on a communication carrier. It is to be noted that the management apparatus 100 may be managed by a specific one of the plurality of communication carriers. In other words, a specific communication carrier may operate the management apparatus 100. In this case, for example, the management apparatus 100 may be connected to a network NW managed by the specific communication carrier, without via the Internet INET, and may be connected to another network NW managed by another communication carrier, via the Internet INET. Also, in a case in which the management apparatus 100 is run by the specific communication carrier, operation for the management apparatus 100 by a terminal apparatus 200 or the like does not depend on a communication carrier.

For example, the management apparatus 100 is realized by a computer system including a processor 110, a storage device 160, and a communication device 170. A plurality of elements of the management apparatus 100 is mutually connected with one or more buses for communicating information. Each of the plurality of elements of the management apparatus 100 may be configured with one or more devices. Alternatively, one or some of the elements of the management apparatus 100 may be omitted.

The processor 110 controls the entire management apparatus 100. For example, the processor 110 is configured with one or more chips. For example, the processor 110 is configured with a central processing unit (CPU) including an interface with a peripheral apparatus, an arithmetic-logic unit, a register, and the like. It should be noted that one, some, or all of the functions of the processor 110 may be realized using hardware, such as a digital signal processor (DSP), an application specific integrated circuit (ASIC), a programmable logic device (PLD), and a field programmable gate array (FPGA). The processor 110 executes various kinds of processing in parallel or in succession.

For example, the processor 110 reads a control program PR1 from the storage device 160 and executes the read control program PR1, thereby functioning as an obtainer 120, an identifier 130, and a service manager 140. It should be noted that the control program PR1 may be transmitted from another apparatus via one of the networks NW.

Figure 6:
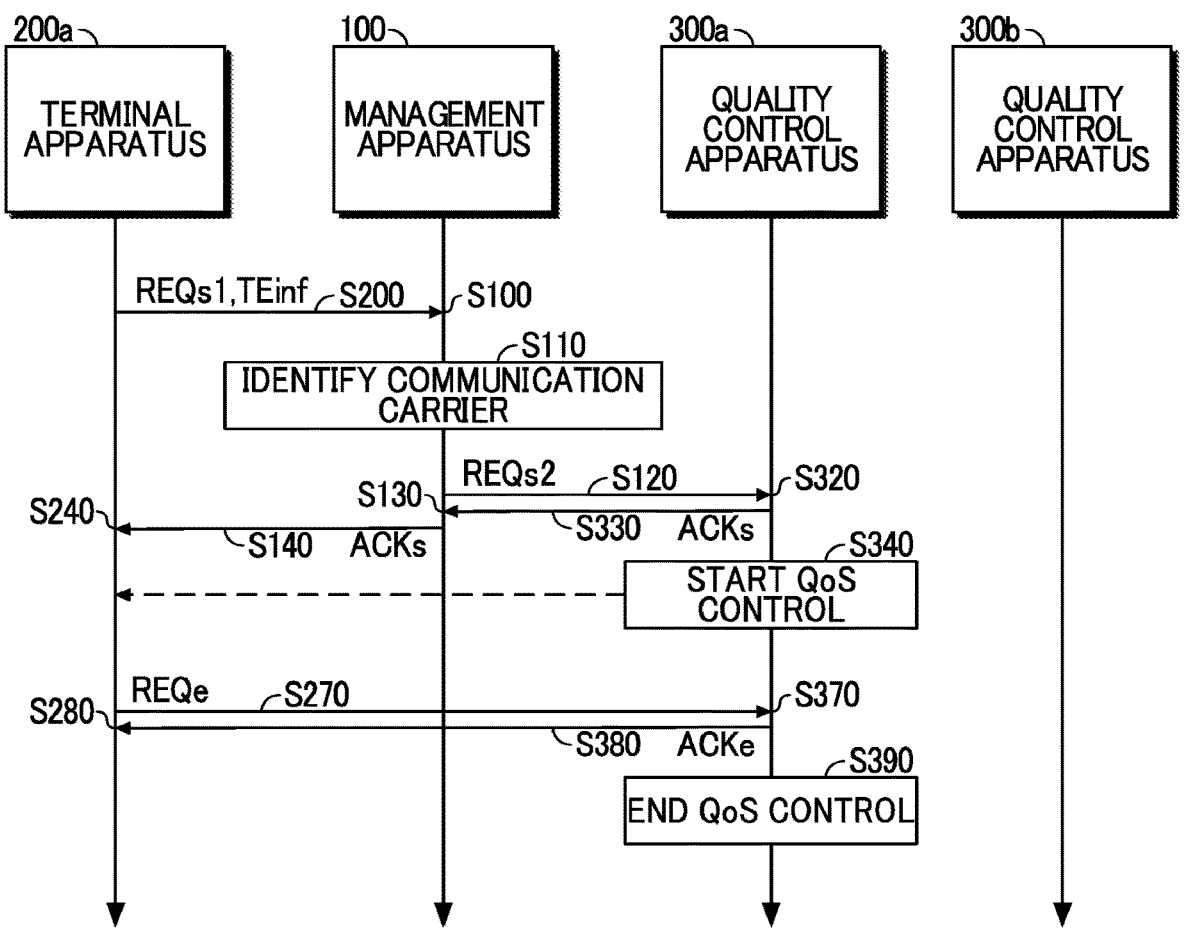
FIG. 6 is a sequence chart showing an example of operation of the network system illustrated in FIG. 1.

For example, the obtainer 120 obtains a start request REQs1 that requests a start of control of quality of a communication service provided to one of the plurality of terminal apparatuses 200, each of which is connected to one of the plurality of networks NW managed by the plurality of communication carriers, and terminal information TEinf about the terminal apparatus 200 (see S100 in FIG. 6). For example, the obtainer 120 obtains, from one of the plurality of terminal apparatuses 200 that has requested the start of the QoS control, a start request REQs1 that requests the start of the QoS control and terminal information TEinf about the terminal apparatus 200. An example of the terminal information TEinf will be described later with reference to FIG. 4.

The identifier 130 identifies, from among the plurality of communication carriers, a communication carrier that manages a network NW to which the terminal apparatus 200 (the terminal apparatus 200 which has requested the start of the QoS control) is connected, based on the terminal information TEinf obtained by the obtainer 120.

The service manager 140 executes predetermined processing for causing a quality control apparatus 300 of the communication carrier (the communication carrier identified by the identifier 130) to start the QoS control for the terminal apparatus 200. For example, information necessary for the service manager 140 to execute the predetermined processing is stored in a management table TBL stored in the storage device 160. An example of the management table TBL will be described later with reference to FIG. 2.

For example, the predetermined processing includes processing of transmitting a start request REQs2 to the quality control apparatus 300 of the communication carrier (see S120 in FIG. 6). In this case, for example, the service manager 140 transmits the start request REQs1 obtained from the terminal apparatus 200 as the start request REQs2 to the quality control apparatus 300 of the communication carrier. With this configuration, for example, the QoS control of the terminal apparatus 200 (the terminal apparatus 200 which has requested the start of the QoS control) is executed by the quality control apparatus 300 of the communication carrier (the quality control apparatus 300 included in the network NW to which the terminal apparatus 200 is connected). In the following, the start requests REQs1 and REQs2 are collectively referred to as a start request REQs in some cases.

The storage device 160 is a recording medium readable by the processor 110 and stores various kinds of data, such as the management table TBL, and a plurality of programs including the control program PR1 to be executed by the processor 110. For example, the storage device 160 may be configured with at least one of a read only memory (ROM), an erasable programmable ROM (EPROM), an electrically erasable programmable ROM (EEPROM), a random access memory (RAM), and the like. The storage device 160 may also be called a register, a cache memory, a main memory (a main storage device), or the like.

The communication device 170 is hardware (a transmitter receiver device) for communicating with other apparatuses, such as the terminal apparatuses 200 and the quality control apparatuses 300, via the networks NW. For example, the communication device 170 is also called a network device, a network controller, a network card, a communication module, or the like. For example, the communication device 170 may be configured including a high-frequency switch, a duplexer, a filter, a frequency synthesizer, and the like in order to achieve one of, or both of, frequency division duplex (FDD) and time division duplex (TDD).

For example, each terminal apparatus 200 is realized by a computer system including a processor 210, a storage device 260, a communication device 270, an input device 280, and an output device 290. The processor 210 controls the entire terminal apparatus 200 and has a configuration substantially the same as that of the above-described processor 110 of the management apparatus 100. For example, the processor 210 reads a control program PR2 from the storage device 260 and executes the read control program PR2, thereby functioning as a requester 220 and the like. It should be noted that the control program PR2 may be transmitted from another apparatus via one of the networks NW.

For example, the requester 220 transmits, in requesting a start of QoS control, a start request REQs1 and terminal information TEinf to the management apparatus 100. Requesting the start of the QoS control may be calling up of a start application programming interface (API) for the QoS control. For example, the requester 220 may call the start API for the QoS control against the management apparatus 100, thereby requesting the management apparatus 100 to start the QoS control.

In the present embodiment, for example, the requester 220 transmits, in requesting an end of the QoS control, an end request REQe that requests the end of the QoS control, to the quality control apparatus 300 (see S270 in FIG. 6). The end request for the QoS control may involve calling up of an end API for the QoS control. For example, the requester 220 may call the end API for the QoS control against the quality control apparatus 300, thereby requesting the quality control apparatus 300 to end the QoS control. The requester 220 may transmit the end request REQe to the quality control apparatus 300 via the management apparatus 100. In the present embodiment, transmitting the start request REQs includes calling up the start API for the QoS control, and transmitting the end request REQe includes calling up the end API for the QoS control.

The storage device 260 is a recording medium readable by the processor 210 and stores various kinds of data, such as a plurality of programs including the control program PR2, to be executed by the processor 210. Similarly to the above-described storage device 160, for example, the storage device 260 may be configured with at least one of a ROM, an EPROM, an EEPROM, a RAM, and the like.

The communication device 270 is hardware (a transmitter receiver device) for communicating with other apparatuses, such as the management apparatus 100 and the quality control apparatus 300, via the network NW, and has a configuration substantially the same as that of the above-described communication device 170.

The input device 280 receives an external input, and may be a keyboard, a mouse, a microphone, a switch, a button, a sensor, etc. For example, the input device 280 receives an input for entering codes, such as numbers and letters, to the processor 210 and an input for selecting an icon displayed on a display surface of the terminal apparatus 200. For example, the input device 280 is preferably a touch panel that detects a touch on the display surface of the terminal apparatus 200. It should be noted that the input device 280 may include a plurality of operators operable by a user.

The output device 290 is an output device, such as a display that performs external output. For example, the output device 290 displays an image under the control by the processor 210. Preferable examples of the output device 290 may include various display panels, such as a liquid crystal display panel and an organic electroluminescent (EL) display panel. It should be noted that the input device 280 and the output device 290 may be formed as a single unit (e.g., a touch panel). The output device 290 may alternatively be an output device including a speaker, a light emitting diode (LED) lamp, and the like.

A quality control apparatus 300 is, for example, an information processing apparatus, such as a server, and executes QoS control. For example, when the quality control apparatus 300 receives a start request REQs2 that requests a start of QoS control for the terminal apparatus 200, the quality control apparatus 300 executes the QoS control of communications performed by the terminal apparatus 200 at a QoS level designated by the start request REQs2. Examples of the QoS level may include a large capacity mode that enables larger capacity data transfer than other quality modes, a low latency mode that enables smaller data latency than other quality modes, a best effort mode that achieves control based on a best effort, and the like. The quality control apparatus 300 is communicable with the management apparatus 100. For example, the QoS level may be designated not only by the terminal apparatus 200, but also by a server, such as the management apparatus 100, or an apparatus included in the network NW (an apparatus, not shown, different from the quality control apparatus 300).

For example, in executing the QoS control at the QoS level designated by the start request REQs2, the quality control apparatus 300 transmits to the management apparatus 100 an acknowledgement ACKs in response to the start request REQs2 (see S330 in FIG. 6). In a case in which the QoS control at the QoS level designated by the start request REQs2 is not executable, the quality control apparatus 300 transmits a negative acknowledgement NACKs in response to the start request REQs2 to the management apparatus 100 (see S332 in FIG. 7). It should be noted that the negative acknowledgement NACKs is an example of "information indicating that control in response to a start request is not executed".

For example, a determination as to whether the QoS control at the QoS level designated by the start request REQs2 is executable is made based on QoS control availability determination information. For example, the QoS control availability determination information includes one, some, or all of network information about a network NW, API information about QoS control, communication service provider information, and urgency information. An example of the network information will be described later with reference to FIG. 5. An example of the API information will be described later with reference to FIG. 3. The provider information is, for example, information for determining whether a communication service provided to a terminal apparatus 200 is provided by a virtual mobile communication carrier. The urgency information indicates a degree of urgency of communications (e.g., whether a disaster occurs, etc.), for example. The QoS control availability determination information may include any item in addition to the above-described items.

FIG. 1 does not illustrate a particular configuration of each quality control apparatus 300. Similarly to the management apparatus 100, each a quality control apparatus 300 may be realized by a computer system including a processor that controls the entire quality control apparatus 300, a storage device that stores various kinds of data, and a communication device for performing communications with another apparatus. It should be noted that the quality control apparatus 300 may be realized as a single apparatus or may be realized as a set of a plurality of apparatuses configured separately from one another. In the quality control apparatus 300, for example, a function of receiving a start request REQs2 and the like and a function of executing QoS control may be realized by a single apparatus or may be realized by a set of two apparatuses configured separately from each other. The quality control apparatus 300 may alternatively include a plurality of apparatuses that execute QoS control. The quality control apparatus 300 is an example of a "quality control system". In other words, the "quality control system" may be realized as a single apparatus or may be realized with a plurality of apparatuses configured separately from one another.

It should be noted that the configurations of the management apparatus 100, terminal apparatuses 200, and quality control apparatuses 300 are not limited to the exemplary configurations illustrated in FIG. 1. Similarly to each terminal apparatus 200, for example, the management apparatus 100 may include an input device and an output device. For example, the management apparatus 100 may also include an auxiliary storage device. The auxiliary storage device is a recording medium readable by the management apparatus 100. For example, the auxiliary storage device may be configured with at least one of an optical disc, such as a compact disc ROM (CD-ROM), a hard disk drive, a flexible disc, a magneto-optical disc (e.g., a compact disc, a digital versatile disc, a Blu-ray (registered trademark) disc, etc.), a smart card, a flash memory (e.g., a card, a stick, a key drive, etc.), a floppy (registered trademark) disk, a magnetic stripe, and the like. Likewise, both the terminal apparatuses 200 and the quality control apparatuses 300 may each include an auxiliary storage device. Alternatively, the terminal apparatuses 200 may each include an auxiliary storage device. As another alternative, the quality control apparatuses 300 may each include an auxiliary storage device. Such an auxiliary storage device may be called a storage.

Furthermore, a network NW may or may not include a quality control apparatus 300 since it is only necessary that the quality control apparatus 300 be able to execute QoS control in the network NW.

FIG. 2 is an explanatory diagram illustrating an example of the management table TBL illustrated in FIG. 1. For example, the management table TBL stores, for each communication carrier, carrier-specific information CAinf including the information necessary for the service manager 140 to execute the predetermined processing.

For example, the management table TBL includes a plurality of records having one-to-one correspondence with the plurality of communication carriers. For example, there are stored in each record of the management table TBL a communication carrier ID for identifying a communication carrier from among the plurality of communication carriers, and carrier-specific information CAinf of the communication carrier indicated by the communication carrier ID.

For example, the carrier-specific information CAinf includes API information about an API notified by a communication carrier to the management apparatus 100, and access destination information indicating an access destination in requesting, for example, a start of QoS control. The API information and the access destination information may be released by the communication carrier. An example of the API information will be described later with reference to FIG. 3. For example, the access destination information may be an internet protocol (IP) address of a quality control apparatus 300 or may be a uniform resource locator (URL) of the API. In addition, the access destination information may be included in the API information.

For example, based on carrier-specific information CAinf of a communication carrier that manages a quality control apparatus 300 to which a start request REQs2 is to be transmitted, the management apparatus 100 transmits the start request REQs2 to the quality control apparatus 300 which executes QoS control. It should be noted that the management table TBL is not limited to the exemplary management table illustrated in FIG. 2. For example, in a case in which the plurality of communication carriers includes a communication carrier that manages two or more networks NW, two or more communication carrier IDs different from each other may be allocated to the communication carrier. For example, the two or more communication carrier IDs allocated to the communication carrier have one-to-one correspondence with the two or more networks NW managed by the communication carrier. For example, that a single communication carrier manages two or more networks NW as mentioned herein may mean that a single communication carrier manages two or more networks NW having different access destinations (different pieces of access destination information) from each other, the access destinations being used in requesting, for example, a start of QoS control.

FIG. 3 is an explanatory diagram illustrating an example of the API information.

For example, the API information includes information about a request to start QoS control, a request to end QoS control, confirmation about a state of QoS control, confirmation as to whether QoS control is available, acquisition of subscriber identity module (SIM) information, and the like. For example, the API information also includes one, some, or all of information indicating a request mode type, information indicating request network quality, SIM information, user equipment information, area information about an area where each terminal apparatus 200 is present, and information indicating a unique function of a communication carrier.

For example, the request mode type is a quality mode (a QoS level, etc.) of QoS control required of a quality control apparatus 300. For example, the request network quality is network quality to be achieved by QoS control required of a quality control apparatus 300 or target network quality. For example, the network quality corresponds to a throughput, a latency time, jitter, a frame rate, a packet loss rate, and the like. For example, the SIM information is information stored in a SIM. For example, the user equipment information is information stored in a terminal apparatus 200. An example of the SIM information and an example of the user equipment information will be described later with reference to FIG. 4.

The area information includes one, some, or all of position information indicating a position of a terminal apparatus 200, map information on an area where the terminal apparatus 200 is present, weather information on the area where the terminal apparatus 200 is present, obstacle information about an obstacle near the terminal apparatus 200, and information indicating the presence or absence of a failure notification regarding communications in the area where the terminal apparatus 200 is present. The area information may include any item in addition to the above-described items. For example, the unique function of a communication carrier is different from a function that is the same as that of another communication carrier and is a function added uniquely by the communication carrier. The unique function is an example of an "additional function".

The items included in the API information are not limited to the exemplary items illustrated in FIG. 3. For example, the API information does not necessarily include one or some of the items illustrated in FIG. 3. Alternatively, the API information may include one, some, or all the items illustrated in FIG. 3 and items different from the items illustrated in FIG. 3 (e.g., the access destination information described with reference to FIG. 2, etc.). The items included in the API information may also be included in the QoS control availability determination information as described with reference to FIG. 1.

FIG. 4 is an explanatory diagram illustrating an example of the terminal information TEinf. For example, the terminal information TEinf includes SIM information and user equipment information.

For example, the SIM information is referred to by the management apparatus 100 in identifying a communication carrier that provides a communication service to a terminal apparatus 200 which has transmitted a start request REQs. For example, the SIM information includes one, some, or all of international mobile subscriber identity (IMSI), mobile subscriber integrated services digital network number (MSNSDN), integrated circuit card ID (ICCID), contract information, and information indicating contract conditions. The items included in the SIM information are not limited to the exemplary items illustrated in FIG. 4. For example, the SIM information may include one, some, or all the items illustrated in FIG. 4 and items different from the items illustrated in FIG. 4.

Similarly to the SIM information, the user equipment information may be referred to by the management apparatus 100 in identifying a communication carrier that provides the communication service to a terminal apparatus 200 which has transmitted the start request REQs. For example, the user equipment information includes one, some, or all of an IP address of the terminal apparatus 200, a model name of the terminal apparatus 200, application information, opposite server information, opposite user equipment information, signature information, package information, operating system (OS) information about an OS of the terminal apparatus 200, memory information about a memory of the terminal apparatus 200, CPU information about a CPU of the terminal apparatus 200, a capacity factor of a CPU, a capacity factor of a memory, and user identity information on a user.

For example, the IP address of a terminal apparatus 200 is information for identifying a communication carrier, and is assigned to the terminal apparatus 200 in order to use a communication service provided by the communication carrier. The IP address of the terminal apparatus 200 is an example of "first identification information". For example, the application information indicates a name and the like of an application program executed in a terminal apparatus 200. For example, the user identity information on a user is information for use in authenticating a user (a fingerprint, an iris, a face, a password, etc.). The items included in the user equipment information are not limited to the exemplary items illustrated in FIG. 4. For example, the user equipment information may include one, some, or all the items illustrated in FIG. 4 and items different from the items illustrated in FIG. 4.

The items included in the terminal information TEinf are not limited to the exemplary items illustrated in FIG. 4. For example, it is not necessary that the terminal information TEinf include both the SIM information and the user equipment information. Alternatively, the terminal information TEinf may include one of, or both of, the SIM information and the user equipment information, and information other than the SIM information and the user equipment information (e.g., network information described later with reference to FIG. 5).

FIG. 5 is an explanatory diagram illustrating an example of the network information. For example, items included in the network information are included in the QoS control availability determination information as described with reference to FIG. 1 and are referred to by a quality control apparatus 300 in determining whether the quality control apparatus 300 is able to execute QoS control at a QoS level designated by a start request REQs2. The items included in the network information may also be included in the terminal information TEinf. In this case, a base station or the like included in a network NW may add the network information to the terminal information TEinf to be transmitted from a terminal apparatus 200 to the management apparatus 100 via the network NW.

For example, the network information includes one, some, or all of 5-tuple information, access point name (APN), communication system information, information indicating network quality, information indicating an operating rate of a base station, information indicating an availability of a base station, and information indicating the number of simultaneous connections to a base station. The 5-tuple information includes a transmission source IP address, a destination IP address, a transmission source port number, a destination port number, and a protocol ID. For example, the communication system information indicates communication methods, such as 3G, 4G, 5G, Wi-Fi (registered trademark), tethering, and wired communication.

The items included in the network information are not limited to the exemplary items illustrated in FIG. 5. For example, the network information may include one, some, or all the items illustrated in FIG. 5 and items different from the items illustrated in FIG. 5. In a case in which the network information is included in the terminal information TEinf, the items of the network information included in the QoS control availability determination information may be different from the items of the network information included in the terminal information TEinf.

FIG. 6 is a sequence chart illustrating an example of operation of the network system 10 illustrated in FIG. 1. It is assumed in the example illustrated in FIG. 6 that a start request REQs1 is transmitted from one of a plurality of terminal apparatuses 200a connected to the network NWa among a plurality of terminal apparatuses 200, each of which is connected to one of the plurality of networks NW. In the description referring to FIG. 6, therefore, it is assumed that the terminal apparatus 200a means a terminal apparatus 200a that has transmitted a start request REQs1, among the plurality of terminal apparatuses 200a connected to the network NWa, unless otherwise specified.

First, the requester 220 of the terminal apparatus 200a transmits a start request REQs1 and terminal information TEinf about the terminal apparatus 200a to the management apparatus 100 in order to request a start of QoS control (S200). The obtainer 120 of the management apparatus 100 thus obtains the start request REQs1 and the terminal information TEinf from the terminal apparatus 200a (S100).

Next, the identifier 130 of the management apparatus 100 identifies a communication carrier that provides a communication service to the terminal apparatus 200a, based on the terminal information TEinf obtained from the terminal apparatus 200a (S110). For example, the identifier 130 of the management apparatus 100 may identify a communication carrier that provides a communication service to the terminal apparatus 200a, based on an IP address of the terminal apparatus 200a included in the terminal information TEinf. The identifier 130 of the management apparatus 100 may alternatively identify a communication carrier that provides a communication service to the terminal apparatus 200a, based on SIM information (e.g., ICCID, etc.) included in the terminal information TEinf. In the following, the communication carrier means a communication carrier that provides a communication service to the terminal apparatus 200a, among the plurality of communication carriers, unless otherwise specified.

When the communication carrier is identified, the service manager 140 of the management apparatus 100 transmits a start request REQs2 to the quality control apparatus 300a of the communication carrier, based on carrier-specific information CAinf corresponding to the communication carrier (S120). For example, the start request REQs2 contains items contained in the start request REQs1 obtained from the terminal apparatus 200a. It should be noted that the start request REQs2 may contain one, some, or all the items included in the API information illustrated in FIG. 3 and the items contained in the start request REQs1. Therefore, transmitting the start request REQs2 to the quality control apparatus 300a includes transmitting the start request REQs1 to the quality control apparatus 300a. In other words, the service manager 140 of the management apparatus 100 executes predetermined processing including processing of transmitting the start request REQs1 obtained from the terminal apparatus 200a to the quality control apparatus 300a.

The quality control apparatus 300a receives the start request REQs2 transmitted from the management apparatus 100 (S320). Next, the quality control apparatus 300a determines whether QoS control at a QoS level designated by the start request REQs2 is executable, based on QoS control availability determination information. It is assumed in the example illustrated in FIG. 6 that the quality control apparatus 300a is able to execute the QoS control at the QoS level designated by the start request REQs2. Therefore, the quality control apparatus 300a transmits an acknowledgement ACKs in response to the start request REQs2 (information indicating that QoS control in response to the start request REQs is executed) to the management apparatus 100 (S330). In addition, the quality control apparatus 300a starts the QoS control at the QoS level designated by the start request REQs2 (S340). For example, the quality control apparatus 300a identifies a telephone number of the terminal apparatus 200a, based on the SIM information and the like included in the API information, and starts the QoS control at the QoS level designated by the start request REQs2, for the terminal apparatus 200a corresponding to the identified telephone number. The QoS control for the terminal apparatus 200a is thus started.

The management apparatus 100 receives the acknowledgement ACKs to the start request REQs2 from the quality control apparatus 300a (S130). Next, the service manager 140 of the management apparatus 100 transmits the acknowledgement ACKs received from the quality control apparatus 300a, to the terminal apparatus 200a (S140). The terminal apparatus 200a receives the acknowledgement ACKs from the management apparatus 100, as a response to the start request REQs1 (S240). The terminal apparatus 200a is thus able to recognize that the QoS control in response to the start request REQs1 has been started.

The requester 220 of the terminal apparatus 200a transmits an end request REQe to the quality control apparatus 300a in a case in which the QoS control of the terminal apparatus 200a is to be ended (S270). For example, information for accessing the quality control apparatus 300a (an address of the quality control apparatus 300a, etc.) may be contained in the acknowledgement ACKs or may be transmitted from the management apparatus 100 to the terminal apparatus 200a independently of the acknowledgement ACKs.

The quality control apparatus 300a receives the end request REQe from the terminal apparatus 200a (S370). Next, the quality control apparatus 300a transmits to the terminal apparatus 200a an acknowledgement ACKe in response to the end request REQe (S380). The terminal apparatus 200a thus receives from the quality control apparatus 300a the acknowledgement ACKe in response to the end request REQe (S280). The quality control apparatus 300a ends the QoS control of the terminal apparatus 200a in accordance with the end request REQe (S390).

In this way, the terminal apparatus 200a transmits the start request REQs1 to the management apparatus 100, thereby causing the quality control apparatus 300a to start the QoS control. That is, the terminal apparatus 200a is able to cause the quality control apparatus 300a to start the QoS control without particularly recognizing a communication carrier that provides a communication service.

For example, in order to utilize QoS control, an application carrier that provides an application program may incorporate into the application program a QoS control software development kit (SDK) for utilizing the QoS control. A start request REQs1 is transmitted to the management apparatus 100 regardless of a communication carrier that manages a network NW to which a terminal apparatus 200 having the application program installed therein is connected. As a result, according to the present embodiment, it is not necessary to change a destination of the start request REQs1 depending on a communication carrier in a case in which an application program is to be created that enables a request to be made to any of the plurality of networks NW managed by the plurality of communication carriers to execute QoS control. According to the present embodiment, therefore, it is possible to prevent or reduce the risk of the application program from becoming complicated.

It is to be noted that, since it is assumed in the example illustrated in FIG. 6 that the terminal apparatus 200a connected to the network NWa transmits the start request REQs1, the quality control apparatus 300b of the communication carrier that manages the network NWb does not particularly execute processing regarding the QoS control of the terminal apparatus 200a.

FIG. 7 is a sequence chart illustrating another example of the operation of the network system 10 illustrated in FIG. 1. Similarly to the example illustrated in FIG. 6, it is assumed in the example illustrated in FIG. 7 that a start request REQs1 is transmitted from one of the plurality of terminal apparatuses 200a connected to the network NWa. Also in the description referring to FIG. 7, therefore, the terminal apparatus 200a means a terminal apparatus 200a that has transmitted a start request REQs1, among the plurality of terminal apparatuses 200a connected to the network NWa, unless otherwise specified. It is also assumed in the example illustrated in FIG. 7 that the quality control apparatus 300a is not able to execute QoS control at a QoS level designated by a start request REQs2. It should be noted in the example illustrated in FIG. 7 that operation until the quality control apparatus 300a receives the start request REQs2 (S200, S100, S110, S120, and S320) is substantially the same as the operation illustrated in FIG. 6; therefore, description thereof will be omitted.

When the quality control apparatus 300a receives the start request REQs2 transmitted from the management apparatus 100, the quality control apparatus 300a determines whether the QoS control at the QoS level designated by the start request REQs2 is executable, based on QoS control availability determination information. Since it is assumed in the example illustrated in FIG. 7 that the quality control apparatus 300a is not able to execute the QoS control at the QoS level designated by the start request REQs2, the quality control apparatus 300a transmits to the management apparatus 100 a negative acknowledgement NACKs in response to the start request REQs2 (S332).

The management apparatus 100 thus receives the negative acknowledgement NACKs from the quality control apparatus 300a, as a response to the start request REQs2 (S132). Next, the service manager 140 of the management apparatus 100 transmits the negative acknowledgement NACKs received from the quality control apparatus 300a, to the terminal apparatus 200a, as a response to the start request REQs1 (S142). The terminal apparatus 200a thus receives the negative acknowledgement NACKs from the management apparatus 100, as a response to the start request REQs1.

It should be noted that operation of the network system 10 is not limited to the exemplary operations illustrated in FIGS. 6 and 7. For example, the service manager 140 of the management apparatus 100 may transmit the terminal information TEinf obtained from the terminal apparatus 200a to the quality control apparatus 300a in addition to the start request REQs2. That is, the predetermined processing may include processing of transmitting the terminal information TEinf to the quality control apparatus 300. The requester 220 of the terminal apparatus 200a may transmit an end request REQe to the quality control apparatus 300a via the management apparatus 100. In other words, the requester 220 of the terminal apparatus 200a may transmit the end request REQe to the management apparatus 100. In this case, the service manager 140 of the management apparatus 100 transmits the end request REQe received from the terminal apparatus 200a, to the quality control apparatus 300a.

In a case in which the quality control apparatus 300a transmits the negative acknowledgement NACKs to the management apparatus 100, the quality control apparatus 300a may transmit reason-for-denial information, indicating why the QoS control is not executable, to the management apparatus 100. In this case, the service manager 140 of the management apparatus 100 may transmit both the negative acknowledgement NACKs and the reason-for-denial information to the terminal apparatus 200a.

The quality control apparatus 300a may transmit the negative acknowledgement NACKs to both the management apparatus 100 and the terminal apparatus 200a or to only the terminal apparatus 200a. Also in this case, the quality control apparatus 300a may transmit the reason-for-denial information together with the negative acknowledgement NACKs.

In a case in which a quality mode designated by a start request REQs1 corresponds to none of a plurality of preset quality modes regarding the QoS control, the service manager 140 of the management apparatus 100 may reject the start request REQs1. In this case, the service manager 140 of the management apparatus 100 may transmit a negative acknowledgement NACKs to the terminal apparatus 200a without transmitting the start request REQs2 to the quality control apparatus 300a. Also in this case, the service manager 140 of the management apparatus 100 may transmit the reason-for-denial information together with the negative acknowledgement NACKs.

The service manager 140 of the management apparatus 100 may determine whether the start request REQs1 is rejected, based on a condition different from the quality mode. In other words, the service manager 140 of the management apparatus 100 may determine whether the quality control apparatus 300a is able to execute the QoS control at a QoS level designated by a start request REQs2, based on the QoS control availability determination information. For example, in a case in which the service manager 140 of the management apparatus 100 determines that the quality control apparatus 300a is not able to execute the QoS control at the QoS level designated by the start request REQs2, the service manager 140 of the management apparatus 100 may transmit a negative acknowledgement NACKs to the terminal apparatus 200a without transmitting a start request REQs2 to the quality control apparatus 300a. Also, in this case, the management apparatus 100 may transmit the reason-for-denial information to the terminal apparatus 200a together with the negative acknowledgement NACKs.

According to the present embodiment described above, the management apparatus 100 includes the obtainer 120, the identifier 130, and the service manager 140. The obtainer 120 obtains a start request REQs1 to request a start of control of quality of a communication service provided to one of a plurality of terminal apparatuses 200, each of which is connected to one of a plurality of networks NW managed by a plurality of communication carriers, and terminal information TEinf about the terminal apparatus 200. The identifier 130 identifies, from among the plurality of communication carriers, a communication carrier that provides the communication service to the terminal apparatus, based on the terminal information TEinf. The service manager 140 executes predetermined processing for causing a quality control apparatus 300 of the identified communication carrier to start the control of the quality of the communication service provided to the terminal apparatus 200.

As described above, according to the present embodiment, the management apparatus 100, which has obtained a start request REQs1 from a terminal apparatus 200, executes the predetermined processing for causing a quality control apparatus 300 of a communication carrier to start the control of the quality of a communication service provided to the terminal apparatus 200. According to the present embodiment, therefore, it is possible for the terminal apparatus 200a to cause the quality control apparatus 300a to start QoS control by transmitting the start request REQs1 to the management apparatus 100 regardless of which communication carrier provides a communication service. In other words, the destination of the start request REQs1 is the management apparatus 100 regardless of which communication carrier manages a network NW to which a terminal apparatus 200 having an application program installed therein is connected. As a result, according to the present embodiment, in a case in which an application program is to be created that enables a request to be made to any of the plurality of networks NW managed by the plurality of communication carriers to execute QoS control, it is possible to prevent or reduce the risk of the application program becoming complicated.

Furthermore, according to the present embodiment, for example, the terminal information TEinf may include an IP address for identifying a communication carrier, the IP address being assigned to the terminal apparatus 200 in order to utilize the communication service provided by the communication carrier. In this case, the identifier 130 is able to easily identify a communication carrier that provides the communication service to the terminal apparatus, based on the IP address of the terminal apparatus 200.

In the present embodiment, for example, the predetermined processing includes processing of transmitting the start request REQs1 to the quality control apparatus 300 of the communication carrier. With this configuration, according to the present embodiment, it is possible to cause the quality control apparatus 300 of the communication carrier to start the control of the quality of the communication service provided to the terminal apparatus 200.

According to the present embodiment, for example, the predetermined processing may include processing of transmitting the terminal information TEinf to the quality control apparatus 300 of the communication carrier. In this case, it is possible for the quality control apparatus 300 to determine whether the QoS control in response to the start request REQs1 is executable, based on the QoS control availability determination information including the terminal information TEinf.

According to the present embodiment, for example, in a case in which the control in response to a start request REQs1 is not executed in a quality control apparatus 300 of a communication carrier, the service manager 140 may transmit, to the terminal apparatus 200, a negative acknowledgement NACKs indicating that the QoS control in response to the start request REQs1 is not executed. In this case, it is possible for the terminal apparatus 200 to recognize that the QoS control in response to the start request REQs1 is not executed, based on the reception of the negative acknowledgement NACKs.

According to the present embodiment, for example, in a case in which a quality mode designated by the start request REQs1 corresponds to none of a plurality of preset quality modes regarding the QoS control, the service manager 140 may reject the start request REQs1. In this case, since the quality control apparatus 300 does not have to determine whether the control in response to the start request REQs1 is executable, it is possible to control increase of load on the quality control apparatus 300.

2. Modification Examples

The present invention is not limited to the embodiment exemplified above. Specific modified aspects are exemplified below. Two or more aspects optionally selected from the following examples may be combined.

First Modification Example

The above-described embodiment describes a case in which the predetermined processing for causing a quality control apparatus 300 to start control of the quality of a communication service includes the processing of transmitting a start request REQs2 to the quality control apparatus 300; however, the present invention is not limited thereto. For example, the predetermined processing may include processing of transmitting, to a terminal apparatus 200, carrier-specific information CAinf necessary for the terminal apparatus 200 to request a quality control apparatus 300 of a communication carrier to start control of the quality of the communication service.

FIG. 8 is a sequence chart illustrating an example of operation of the network system 10 according to the first modification example. Similarly to the example illustrated in FIG. 6, it is assumed in the example illustrated in FIG. 8 that a start request REQs1 is transmitted from one of the plurality of terminal apparatuses 200a connected to the network NWa. Also in the description referring to FIG. 8, therefore, the terminal apparatus 200a means a terminal apparatus 200a that has transmitted a start request REQs1, among the plurality of terminal apparatuses 200a connected to the network NWa, unless otherwise specified. In addition, a detailed description on operation similar to the operation described with reference to FIGS. 1 to 7 will be omitted.

In the example illustrated in FIG. 8, operation of the management apparatus 100 is substantially the same as the operation of the management apparatus 100 illustrated in FIG. 6, except that processing in step S120A is performed in place of the processing in step S120 illustrated in FIG. 6, and the processing in step S140 illustrated in FIG. 6 is not performed. In addition, operation of the terminal apparatus 200a in FIG. 8 is substantially the same as the operation of the terminal apparatus 200a illustrated in FIG. 6, except that processing in step S210 and processing in step S220 are performed, and processing in step S230 is performed in place of the processing in step S240 illustrated in FIG. 6. It should be noted that operation of the quality control apparatus 300a is substantially the same as the operation of the quality control apparatus 300a illustrated in FIG. 6. However, in the operation illustrated in FIG. 8, a start request REQs2 to be received by the quality control apparatus 300a is transmitted from the terminal apparatus 200a and a transmission destination of an acknowledgement ACKs is the terminal apparatus 200a.

For example, the management apparatus 100 identifies a communication carrier that provides a communication service to the terminal apparatus 200a, based on the terminal information TEinf, and then transmits the carrier-specific information CAinf described with reference to FIG. 2, FIG. 3, and the like, to the terminal apparatus 200a (S120A). In other words, the service manager 140 of the management apparatus 100 transmits, to the terminal apparatus 200a, the carrier-specific information CAinf necessary for the terminal apparatus 200a to request the quality control apparatus 300a of the communication carrier to start the control of the quality of the communication service.

The terminal apparatus 200a thus receives the carrier-specific information CAinf on the communication carrier from the management apparatus 100 (S210). Next, the requester 220 of the terminal apparatus 200a transmits a start request REQs2 to the quality control apparatus 300a, based on the carrier-specific information CAinf received from the management apparatus 100 (S220). In other words, the requester 220 of the terminal apparatus 200a transmits the start request REQs2 to the quality control apparatus 300a, based on the carrier-specific information CAinf, which is received from the management apparatus 100 as a response to the start request REQs1 the terminal apparatus has transmitted to the management apparatus 100.

The quality control apparatus 300a thus receives the start request REQs2 transmitted from the terminal apparatus 200a (S320). Next, the quality control apparatus 300a determines whether QoS control at a QoS level designated by the start request REQs2 is executable, based on QoS control availability determination information. It is assumed in the example illustrated in FIG. 8 that the quality control apparatus 300a is able to execute the QoS control at the QoS level designated by the start request REQs2. Therefore, the quality control apparatus 300a transmits an acknowledgement ACKs to the start request REQs2 (information indicating that the QoS control in response to the start request REQs is executed) to the terminal apparatus 200a (S330). In addition, the quality control apparatus 300a starts the QoS control at the QoS level designated by the start request REQs2 (S340). The QoS control of the terminal apparatus 200a is thus started.

The terminal apparatus 200a receives the acknowledgement ACKs in response to the start request REQs2, from the quality control apparatus 300a (S230). The terminal apparatus 200a is thus able to recognize that the QoS control in response to the start request REQs2 has been started.

In this way, the terminal apparatus 200a transmits the start request REQs1 to the management apparatus 100, thereby obtaining the carrier-specific information CAinf necessary for causing the quality control apparatus 300a to start the QoS control. As a result, also in the first modification example, in a case in which an application program is to be created that enables a request to be made to any of the plurality of networks NW managed by the plurality of communication carriers to execute QoS control, it is not necessary to change the destination of the start request REQs1 depending on a communication carrier. Also, in the first modification example, therefore, it is possible to prevent or reduce the risk of the application program becoming complicated.

According to the first modification example described above, the processing (S120A) of transmitting the carrier-specific information CAinf to the terminal apparatus 200 which has transmitted the start request REQs is executed as the predetermined processing in place of the processing (S120) of transmitting the start request REQs2 and the like to the quality control apparatus 300. According to the first modification example, it is also possible to attain substantially the same effects as those attained in the above-described embodiment.

Second Modification Example

The above-described embodiment and first modification example each describe a case in which a terminal apparatus 200a transmits an end request REQe to a quality control apparatus 300a; however, the present invention is not limited thereto. For example, in a case in which a predetermined control end condition regarding a terminal apparatus 200 is satisfied, the service manager 140 may transmit, to a quality control apparatus 300 of a communication carrier, an end request REQe to request an end of the control of the quality of the communication service provided to the terminal apparatus 200.

FIG. 9 is a sequence chart illustrating an example operation of the network system 10 according to a second modification example. FIG. 9 illustrates an example operation of the network system 10 after QoS control of one of the plurality of terminal apparatuses 200a connected to the network NWa is started. Also, in the description referring to FIG. 9, therefore, the terminal apparatus 200a means a terminal apparatus 200a that has transmitted a start request REQs1, among the plurality of terminal apparatuses 200a connected to the network NWa, unless otherwise specified. In addition, detailed description of operation similar to the operation described with reference to FIGS. 1 to 8 will be omitted.

It is assumed in the example illustrated in FIG. 9 that a control end condition is that an application program to be subjected to QoS control ends abnormally. In the following, the application program to be subjected to QoS control is also referred to as a control target application program. It should be noted that a star mark in FIG. 9 indicates that the control target application program ends abnormally. It is also assumed in the example illustrated in FIG. 9 that during a period in which the control target application program is running, the terminal apparatus 200a transmits terminal identification information TIDinf for identifying the terminal apparatus 200a to the management apparatus 100 at predetermined intervals. For example, an "X" mark in FIG. 9 indicates that the transmission of the terminal identification information TIDinf is interrupted.

During the period in which the control target application program is running, the terminal apparatus 200a transmits the terminal identification information TIDinf to the management apparatus 100 at predetermined intervals (S250). For example, transmitting the terminal identification information TIDinf may be executing a ping command.

The service manager 140 of the management apparatus 100 obtains the start request REQs1 from the terminal apparatus 200a, and then monitors the operation of the terminal apparatus 200a in order to detect an abnormal end of the control target application program (S150). For example, the service manager 140 of the management apparatus 100 monitors whether the terminal identification information TIDinf is transmitted from the terminal apparatus 200a at predetermined intervals.

When the control target application program ends abnormally (see the star mark in FIG. 9), the transmission of the terminal identification information TIDinf is interrupted (see the "X" mark in FIG. 9). In this case, the management apparatus 100 is unable to receive the subsequent terminal identification information TIDinf from the terminal apparatus 200a even after a predetermined time (corresponding to each predetermined interval) or longer has elapsed from the time when the management apparatus 100 received the terminal identification information TIDinf from the terminal apparatus 200a. Therefore, the service manager 140 of the management apparatus 100 determines that the transmission of the terminal identification information TIDinf from the terminal apparatus 200a is interrupted. Since the transmission of the terminal identification information TIDinf from the terminal apparatus 200a has been interrupted, the service manager 140 of the management apparatus 100 determines that the control target application program has ended abnormally. In other words, the service manager 140 of the management apparatus 100 determines that the control end condition is satisfied (S160). Therefore, the service manager 140 of the management apparatus 100 transmits, to the quality control apparatus 300a, an end request REQe that requests the end of the QoS control for the terminal apparatus 200a (S170).

The quality control apparatus 300a thus receives the end request REQe from the management apparatus 100 (S370). Next, the quality control apparatus 300a transmits to the management apparatus 100 an acknowledgement ACKe in response to the end request REQe (S380). The management apparatus 100 thus receives the acknowledgement ACKe in response to the end request REQe, from the quality control apparatus 300a (S180). The quality control apparatus 300a ends the QoS control of the terminal apparatus 200a in accordance with the end request REQe (S390).

In this way, for example, it is possible for the management apparatus 100 to end the QoS control of the terminal apparatus 200a when the control target application program is ended abnormally. As a result, according to the second modification example, it is possible to prevent or reduce unnecessary QoS control from continuing.

In a case in which the control target application program ends normally, the end request REQe is transmitted from the terminal apparatus 200a to the quality control apparatus 300a, so that the QoS control of the terminal apparatus 200a ends. Also in this case, since the transmission of the terminal identification information TIDinf is interrupted, the end request REQe is transmitted from the management apparatus 100. However, since the end request REQe is a request to end the QoS control for the terminal apparatus 200a, no particular problem occurs even in a case in which the end request REQe is transmitted from each of the terminal apparatus 200a and the management apparatus 100 to the quality control apparatus 300a. It is to be noted that, in a case in which the control target application program ends normally, the terminal apparatus 200a may transmit the end request REQe to both the management apparatus 100 and the quality control apparatus 300a. In this case, the management apparatus 100, which has received the end request REQe from the terminal apparatus 200a, may stop monitoring the operation of the terminal apparatus 200a, without transmitting the end request REQe to the quality control apparatus 300a.

The operation of the network system 10 according to the second modification example is not limited to the exemplary operation illustrated in FIG. 9. For example, in a case in which the service manager 140 of the management apparatus 100 receives from the quality control apparatus 300a an acknowledgement ACKe in response to the end request REQe, the service manager 140 of the management apparatus 100 may transmit information indicating the end of the QoS control to the terminal apparatus 200a. For example, the method of monitoring the operation of the terminal apparatus 200a is not limited to the method using the terminal identification information TIDinf. For example, the service manager 140 of the management apparatus 100 may monitor the operation of the terminal apparatus 200a, by inquiring of the terminal apparatus 200a as to whether the control target application program is running.

The control end condition is not limited to the condition in which the control target application program is ended abnormally. For example, the control end condition may be a condition in which the terminal apparatus 200a ends abnormally or may be a condition in which the connection between the terminal apparatus 200a and the network NWa is disconnected without execution of preset processing.

For example, the end of the QoS control may be executed on a single terminal apparatus 200 that undergoes connection failure, such as a disconnection between the terminal apparatus and the network NWa. Alternatively, the end of the QoS control may be executed on a plurality of terminal apparatuses 200 that undergo connection failure. As another alternative, if a terminal apparatus 200 connected to a network NWa undergoes connection failure, the end of the QoS control may be executed on all the terminal apparatuses 200 connected to the network NWa.

Furthermore, for example, the quality control apparatus 300a may reject the end request REQe from the management apparatus 100.

According to the second modification example described above, it is also possible to attain substantially the same effects as those attained in the above-described embodiment and first modification example. According to the second modification example, moreover, in a case in which the predetermined control end condition regarding the terminal apparatus 200 is satisfied, the QoS control against the terminal apparatus 200 can be ended. Therefore, it is possible to prevent or reduce unnecessary QoS control from continuing. In other words, according to the second modification example, in a case in which the control target application program or the like ends abnormally, or in a case in which the connection between the terminal apparatus 200a and the network NWa is disconnected without execution of the preset processing, it is possible to restore the quality of the communication service in the network NWa normally to its original state (a state before execution of the QoS control of the terminal apparatus 200a). For example, it is to be noted that the quality control apparatus 300a may monitor the operation of the terminal apparatus 200a and may determine whether the control end condition is satisfied.

Third Modification Example

In each of the above-described embodiment, first modification example, and second modification example, no particular description is given of operation of the management apparatus 100 in a case in which a unique function of a communication carrier is added; however, in a case in which the unique function is added, the management apparatus 100 may transmit information indicative of the unique function to a terminal apparatus 200 which has transmitted a start request REQs.

For example, in a case in which a function regarding QoS control executable by a communication carrier identified by the identifier 130 includes a function that is the same as in the plurality of communication carriers and is a unique function, the service manager 140 may transmit information indicative of the unique function to the terminal apparatus 200 which has transmitted the start request REQs. That is, the predetermined processing may include processing of, in a case in which the function regarding the QoS control executable by the communication carrier includes a common function of the plurality of communication carriers and a unique function added by a communication carrier, transmitting the information indicative of the unique function to the terminal apparatus 200.

For example, the common function of the plurality of communication carriers is a quality mode of QoS control which can be required of the quality control apparatus 300 by the terminal apparatus 200, regardless of whether the terminal apparatus 200 has received the information indicating the unique function. Examples of the common function of the plurality of communication carriers may include a large capacity mode, a low latency mode, and a best effort mode. In this case, a quality mode different from any of the large capacity mode, the low latency mode, and the best effort mode (i.e., a unique function) may be added, for each communication carrier, to the function regarding the QoS control. Alternatively, a unique function for configuring more detailed setting of at least one of the large capacity mode, the low latency mode, and the best effort mode may be added, for each communication carrier, to the function regarding the QoS control. It should be noted that the management apparatus 100 may have a function that allows each communication carrier to assign a code regarding the addition of the unique function.

When the terminal apparatus 200 receives the information indicating the unique function, the terminal apparatus 200 may select a desired function from a plurality of functions including the common function of the plurality of communication carriers and the unique function, as a quality mode of QoS control required of the quality control apparatus 300. For example, the terminal apparatus 200 may transmit, to the management apparatus 100 or the quality control apparatus 300, a start request REQs that requests QoS control under the function (i.e., the quality mode) selected from the plurality of functions including the common function to the plurality of communication carriers and the unique function.

In a case in which the communication carrier that provides the communication service is changed to another communication carrier, the terminal apparatus 200 may delete the information indicating the unique function of the communication carrier before the change such that the unique function of the communication carrier before the change cannot be selected.

As described, according to the third modification example described above, it is also possible to attain substantially the same effects as those attained in the above-described embodiment, first modification example, and second modification example. According to the third modification example, moreover, it is possible for the terminal apparatus 200 to request the QoS control under the unique function of the communication carrier. It is to be noted, for example, that the quality control apparatus 300 may transmit the information indicative of the unique function, to the terminal apparatus 200 that has transmitted the start request REQs.

Fourth Modification Example

None of the above-described embodiment, first modification example, second modification example, and third modification example describe a particular case in which a communication carrier, identified by the identifier 130, is a virtual mobile communication carrier; however, in a case in which the communication carrier is a virtual mobile communication carrier, the management apparatus 100 may operate as will be described below, for example.

In a case in which a virtual mobile communication carrier has the authority to execute QoS control on a network NW managed by the virtual mobile communication carrier, the operation of the management apparatus 100 is substantially the same as the operation of the management apparatus 100 according to each of the above-described embodiment, first modification example, second modification example, and third modification example.

For example, in a case in which another communication carrier has the authority to execute the QoS control on the network NW managed by the virtual mobile communication carrier, the management apparatus 100 may transmit a start request REQs2 and carrier identification information for identifying the virtual mobile communication carrier, to the quality control apparatus 300 of the other communication carrier. For example, the other communication carrier is a mobile communication carrier that leases the network NW to the virtual mobile communication carrier. For example, the carrier identification information may be an APN of the virtual mobile communication carrier. It should be noted that the carrier identification information is an example of "second identification information". The quality control apparatus 300 of the other communication carrier may determine whether QoS control is executed, based on the start request REQs2 and the carrier identification information. For example, a predetermined apparatus of the virtual mobile communication carrier may alternatively inquire whether the QoS control is executed of the quality control apparatus 300 of the other communication carrier.

A case in which another communication carrier has the authority to execute the QoS control on the network NW managed by the virtual mobile communication carrier corresponds to a case in which the virtual mobile communication carrier and the other communication carrier share the same quality control apparatus 300. That is, in a case in which a first communication carrier is a virtual mobile communication carrier and the quality control apparatus 300 of the virtual mobile communication carrier is the same as the quality control apparatus 300 of, among the plurality of communication carriers, a second communication carrier different from the first communication carrier, the predetermined processing may include processing of transmitting the start request REQs and the carrier identification information to the quality control apparatus 300.

According to the fourth modification example described above, it is also possible to attain substantially the same effects as those attained in the above-described embodiment, first modification example, second modification example, and third modification example.

Fifth Modification Example

None of the above-described embodiment and modification examples from the first modification example to the fourth modification example particularly describe a case in which a communication service is provided by international roaming; however, in a case in which the communication service is provided by international roaming, operation of the management apparatus 100 may be substantially the same as those in the above-described embodiment and modification examples. However, the management apparatus 100 or the terminal apparatus 200 may determine whether a communication service is provided by international roaming and may determine whether to request a start of QoS control, based on a result of the determination. Alternatively, the quality control apparatus 300 may determine whether a communication service is provided by international roaming and may determine whether to execute QoS control, based on a result of the determination. According to the fifth modification example described above, it is also possible to attain substantially the same effects as those attained in the above-described embodiment and modification examples.

Sixth Modification Example

None of the above-described embodiment and modification examples from the first modification example to the fifth modification example describe a particular case in which one terminal apparatus 200 is simultaneously connected to a plurality of networks NW respectively managed by a plurality of communication carriers; however, a single terminal apparatus 200 may be simultaneously connected to a plurality of networks NW. That is, a terminal apparatus 200 corresponds to, even when being simultaneously connected to the plurality of networks NW, "one of the plurality of terminal apparatuses, each of which is connected to one of the plurality of networks". For example, a state in which a single terminal apparatus 200 is simultaneously connected to a plurality of networks NW corresponds to a state in which connections of the terminal apparatus 200 with the plurality of networks NW have been established.

It is assumed in the following description that a terminal apparatus 200 simultaneously connected to the networks NWa and NWb transmits a start request REQs1 and terminal information TEinf to the management apparatus 100 via the network NWa. In this case, for example, the identifier 130 of the management apparatus 100 may identify a communication carrier that manages the network NWa used for transmission of the start request REQs1 and the like (a communication carrier that provides a communication service to the terminal apparatus 200), based on SIM information and the like included in terminal information TEinf.

It is also assumed in the following description that the terminal apparatus 200 simultaneously connected to the networks NWa and NWb transmits a start request REQs1 and the terminal information TEinf to the management apparatus 100 via the network NWa, and further transmits a start request REQs1 and the terminal information TEinf to the management apparatus 100 via the network NWb. In this case, for example, the identifier 130 of the management apparatus 100 identifies a communication carrier that manages the network NWa, based on the terminal information TEinf obtained via the network NWa, and identifies a communication carrier that manages the network NWb, based on the terminal information TEinf obtained via the network NWb.

Also in the sixth modification example, a communication carrier that provides the communication service to the terminal apparatus 200 can be identified based on the terminal information TEinf. Therefore, according to the sixth modification example, it is also possible to attain substantially the same effects as those attained in the above-described embodiment and modification examples from the first modification example to the fifth modification example.

It should be noted that the identifier 130 of the management apparatus 100 may identify one or some of a plurality of communication carriers identified based on multiple pieces of terminal information TEinf obtained from the terminal apparatuses 200, as one or more communication carriers that manage one or more quality control apparatuses 300 for executing QoS control. For example, the identifier 130 may identify, from among a plurality of communication carriers identified based on the multiple pieces of terminal information TEinf, a communication carrier with a highest radio wave intensity, as a communication carrier that manages the quality control apparatus 300 for executing QoS control. Alternatively, the identifier 130 may identify, from among the plurality of communication carriers identified based on the multiple pieces of terminal information TEinf, a communication carrier having a base station located closest to the terminal apparatus 200 as a communication carrier that manages the quality control apparatus 300 for executing QoS control. It should be noted that the method of identifying a communication carrier that manages the quality control apparatus 300 for executing the QoS control, from among the plurality of communication carriers identified based on the multiple pieces of terminal information TEinf, is not limited to the exemplary method described above.

In a case in which the management apparatus 100 identifies a communication carrier that manages the quality control apparatus 300 for executing the QoS control, from the plurality of communication carriers identified based on the multiple pieces of terminal information TEinf, the management apparatus 100 may temporarily stop communications between the terminal apparatus 200 and a network NW managed by a communication carrier other than the identified communication carrier. In this case, since the terminal apparatus 200 is able to efficiently use the network NW of a high communication quality, it is possible to prevent or reduce degradation in the quality of the communication service provided to the terminal apparatus 200.

Seventh Modification Example

The above-described embodiment and modification examples from the first modification example to the sixth modification example each describe a case in which a terminal apparatus 200 transmits a start request REQs1 to the management apparatus 100; however, the present invention is not limited thereto. For example, an application management apparatus (not shown) with which a terminal apparatus 200 executing an application program to be subjected to QoS control communicate may transmit, to the management apparatus 100, a start request REQs1 of QoS control for the terminal apparatus 200 and terminal information TEinf about the terminal apparatus 200. That is, the obtainer 120 of the management apparatus 100 may obtain from the application management apparatus the start request REQs1 of the QoS control for the terminal apparatus 200 and the terminal information TEinf about the terminal apparatus 200. Also in this case, it is possible to attain substantially the same effects as those attained in the above-described embodiment and modification examples from the first modification example to the sixth modification example.

Even in a case in which the start request REQs1 is not transmitted from the terminal apparatus 200 or the application management apparatus, the obtainer 120 of the management apparatus 100 may obtain from the terminal apparatus 200 or the application management apparatus the terminal information TEinf about the terminal apparatus 200 executing the application program to be subjected to the QoS control. Then, even when the obtainer 120 does not obtain the start request REQs1, the service manager 140 of the management apparatus 100 may transmit the start request REQs2 and the end request REQe to a quality control apparatus 300, based on the terminal information TEinf (e.g., application information, area information, etc.). For example, in a case in which a quality control apparatus 300 executing the QoS control is changed due to a change in position of the terminal apparatus 200 subjected to the QoS control, the service manager 140 may transmit a start request REQs2 to a quality control apparatus 300 after the change, based on area information and the like included in the terminal information TEinf. Also, in a case in which the service manager 140 transmits a start request REQs2 and the like, it is possible to attain substantially the same effects as those attained in the above-described embodiment and modification examples from the first modification example to the sixth modification example.

3. Other Matters (1) In each embodiment described above, the storage device (e.g., the storage device 160, 260) is a recording medium readable by a processor (e.g., the processor 110, 210), and, although ROM and RAM have been shown as examples, may be constituted by, for example, a flexible disk, a magnetic optical disk (e.g., a compact disc, a digital versatile disc, a Blu-ray (registered trademark) disk, etc.), a smart card, a flash memory device (e.g., a card, a stick, a key drive, etc.), a CD-ROM (Compact Disc-ROM), a register, a removable disk, a hard disk, a floppy (registered trademark) disk, a magnetic stripe, a database, a server, and/or other appropriate storage media. A program may be transmitted via a telecommunication line network from the network. A program may be transmitted via a telecommunication line network from the communication network.

(2) The aspects and embodiments described herein are applicable to at least one of systems utilizing long term evolution (LTE), LTE-advanced (LTE-A), SUPER 3G, IMT-Advanced, 4th generation mobile communication system (4G), 4th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi), IEEE 802.16 (WiMax (registered trademark)), IEEE 802.20, Ultra-WideBand (UWB), Bluetooth (registered trademark), systems using other proper systems, and next generation systems extended based thereon, or to a combination of more than one system (e.g., a combination of at least one of LTE or LET-A and 5G).

(3) In each embodiment described above, the information, signals and/or other matters that have been described may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combinations of these.

(4) In each embodiment described above, the information or the like that are input or output may be stored in a specific place (for example, in a memory) or may be managed using a management table. The information and/or the like that are input and/or output can be overwritten, updated, or added. The information and/or the like that are input and/or output may be deleted. The information and/or the like that are input and/or output may be transmitted to other apparatuses.

(5) In each embodiment described above, determinations may be made based on values represented by one bit (0 or 1), may be made based on Boolean values ("true" or "false"), or may be made by comparing numerical values (for example, based on comparison with a predetermined value).

(6) The order of processes, sequences, flowcharts, etc., in each embodiment described above may be re-ordered as long as conflicts do not arise. For example, although various methods have been described in this specification with various components of steps in exemplary orders, the specific orders illustrated herein are by no means limiting.

(7) The functions exemplarily shown in FIGS. 1, etc., are realized by any combination of at least one of hardware or software. Furthermore, each function block may be realized by any method. Each function block may be realized by a single apparatus physically or logically coupled, or by two or more physically or logically separated apparatuses directly or indirectly (e.g., by wire or wirelessly) connected. Function blocks may be realized by the single apparatus or two or more apparatuses in combination with software.

The communication device 170, 270 is a hardware (transceiver device) that communicates with other apparatuses through at least one of a wired network or a wireless network, and is also referred to as, for example, a network device, a network controller, a network card, or a communication module. The communication device 170, 270 may be configured to include high-frequency switches, duplexers, filters, frequency synthesizers, etc., to realize at least one of a Frequency Division Duplex (FDD) or Time Division Duplex (TDD).

(8) The program illustrated in each embodiment described above should be broadly interpreted so as to refer to an instruction, an instruction set, a code, a code segment, a program code, a program, a sub program, a software module, an application, a software application, a software package, a routine, a subroutine, an object, an executable file, an executable thread, an execution thread, a procedure, a function or the like, regardless of whether the program is called software, firmware, middleware, microcode, or a hardware description language, or is called something else.

Furthermore, the software, the instructions, and the like may be transmitted and received through a transmission medium. For example, in a case in which the software is transmitted from at least one of a website, a server, or any other remote source using a wired technology, such as a coaxial cable, an optical fiber cable, a twisted pair, and a digital subscriber line (DSL), or a wireless technology such as an infrared, radio waves, and microwaves, at least one of these wired technologies or the wireless technologies are included within the definition of the transmission medium.

(9) In each embodiment described above, the term "systems" and "networks" may be used interchangeably.

(10) The information and parameters, etc., in each embodiment described above may be represented in absolute values, may be represented in relative values with respect to predetermined values, or may be represented using other applicable pieces of information. For example, radio resources may be specified using indices. The names used for the parameters described above are not limiting names in any respect. Furthermore, the mathematical formulas and other formulas using these parameters may differ from those explicitly disclosed in the present disclosure. Since the various channels (e.g., PUCCH, PDCCH, etc.) and information elements can be identified by any suitable name, the various names assigned to these various channels and information elements are not in any way limiting names.

(11) In each embodiment described above, there is included a case in which the terminal apparatus 200 is a mobile station (MS). A mobile station may be referred to, by one skilled in the art, as a "subscriber station", a "mobile unit", a "subscriber unit", a "wireless unit", a "remote unit", a "mobile device", a "wireless device", a "wireless communication device", a "remote device", a "mobile subscriber station", an "access terminal", a "mobile terminal", a "wireless terminal", a "remote terminal", a "handset", a "user agent", a "mobile client", a "client" or some other suitable terms. Furthermore, in the present disclosure, the terms such as a "mobile station", a "user terminal", "user equipment (UE)", a "terminal, etc., may be used interchangeably.

(12) In each embodiment described above, the term "connected", "coupled", and all the other variations of these terms mean all direct or indirect connections or coupling between two or more elements, and may indicate the presence of one or more intermediate elements between two elements that are "connected" or "coupled" with each other. The coupling or connection between these elements may be physical or logical, or may be a combination of these. For example, "connection" may be read as "access". As used herein, two elements may be considered "connected" or "coupled" to each other by using at least one of one or more electrical wires, cables or printed electrical connections, and as non-limiting and non-inclusive examples, by using electromagnetic energy, such as electromagnetic energy having wavelengths in radio frequency regions, microwave regions and optical (both visible and invisible) regions.

(13) In each embodiment described above, the phrase "based on" does not mean "based only on" unless otherwise specified. In other words, the phrase "based on" means both "based only on" and "based at least on".

(14) The term "determining" as used in the present description may include a variety of different operations. For example, an act of having judged, calculated, computed, processed, derived, investigated, looked up (for example, in a search of a table, database, or other data construct), or ascertained, may be considered as having "determined". In addition, an act of having received (e.g., received information), transmitting (e.g., transmitting information), input, output, or accessed (e.g., accessed data in a memory), may be considered as having "determined". In addition, an act of having resolved, selected, chosen, established, or compared may be considered as having "determined". In other words, to "determine" may include anything that can be considered to have "determined" some kind of operation. Furthermore, to "determine" may be read as one of "assuming", "expecting", "considering", etc.

(15) In each embodiment described above, terms such as "include", "including", and variations of these are used in this specification or claims, these terms are intended to be inclusive, in a manner similar to the way the term "comprising" is used. Furthermore, the term "or" as used in this specification or claims is not intended to be an exclusive disjunction.

(16) In the present disclosure, in a case in which articles are added in the translation, for example, "a", "an", or "the" in English, these articles include plural forms, unless it is clearly indicated by the context that they do not.

(17) In the present disclosure, a phrase "A and B are different" may mean "A and B are different from each other". The phrase "A and B are different" may mean "A and B each are different from C". A term such as "away from" and "coupled" may be interpreted in the same manner as "different from".

(18) Each of the aspects/embodiments described in this disclosure may be used alone, in combination, or switched as it is executed. Notifying predetermined information (e.g., notification of "being X") is not limited to explicit notification, but may also be performed implicitly (e.g., by not notifying the predetermined information).

Although the present disclosure has been described in detail above, it should be obvious to one skilled in the art that the present disclosure is by no means limited to the embodiment described herein. The present disclosure can be implemented with a variety of corrections and in a variety of variations, without departing from the spirit and scope of the present invention defined by the recitation of claims. Consequently, the description herein is provided only for the purpose of explaining examples, and should by no means be construed to limit the present invention in any way.

DESCRIPTION OF REFERENCE SIGNS

10 . . . network system, 100 . . . management apparatus, 110 . . . processor, 120 . . . obtainer, 130 . . . identifier, 140 . . . service manager, 160 . . . storage device, 170 . . . communication device, 200 . . . terminal apparatus, 210 . . . processor, 220 . . . requestor, 260 . . . storage device, 270 . . . communication device, 280 . . . input device, 290 . . . output device, 300 . . . quality control apparatus

The invention claimed is:

1. A management apparatus comprising:
an obtainer configured to obtain:
a start request to request a start of control of quality of a communication service provided to one of a plurality of terminal apparatuses, each of the plurality of terminal apparatuses being connected to one of a plurality of networks managed by a plurality of communication carriers, and
terminal information about the terminal apparatus;
an identifier configured to identify, from among the plurality of communication carriers, a communication carrier that provides the communication service to the terminal apparatus, based on the terminal information; and
a service manager configured to execute predetermined processing for causing a quality control system of the identified communication carrier to start the control of the quality of the communication service to the terminal apparatus.

2. The management apparatus according to claim 1, wherein
the terminal information includes first identification information for identifying the communication carrier, the first identification information being assigned to the terminal apparatus in order to use the communication service provided by the communication carrier.

3. The management apparatus according to claim 1, wherein
the predetermined processing includes processing of transmitting the start request to the quality control system of the communication carrier.

4. The management apparatus according to claim 3, wherein
the predetermined processing includes processing of transmitting the terminal information to the quality control system of the communication carrier.

5. The management apparatus according to claim 1, wherein
the predetermined processing includes processing of transmitting, to the terminal apparatus, information necessary for the terminal apparatus to request the quality control system of the communication carrier, to control the quality of the communication service.

6. The management apparatus according to claim 1, wherein
in a case in which the control in response to the start request is not executed in the quality control system of the communication carrier, the service manager is configured to transmit, to the terminal apparatus, information indicating that the control in response to the start request is not executed.

7. The management apparatus according to claim 1, wherein
in a case in which a function regarding the control of the quality of the communication service executable by the communication carrier includes a common function to the plurality of communication carriers and an additional function added by the communication carrier, the predetermined processing includes processing of transmitting, to the terminal apparatus, information indicating the additional function.

8. The management apparatus according to claim 1, wherein
in a case in which a predetermined control end condition regarding the terminal apparatus is satisfied, the service manager is configured to transmit, to the quality control system of the communication carrier, an end request to request an end of the control of the quality of the communication service provided to the terminal apparatus.

9. The management apparatus according to claim 1, wherein
in a case in which the communication carrier is a virtual mobile communication carrier and the quality control system of the virtual mobile communication carrier is the same as a quality control system of another communication carrier different from the communication carrier among the plurality of communication carriers, the predetermined processing includes processing of transmitting the start request and second identification information for identifying the virtual mobile communication carrier, to the quality control system of the another communication carrier.

10. The management apparatus according to claim 1, wherein
in a case in which a quality mode designated by the start request corresponds to none of a plurality of preset quality modes regarding the control of the quality of the communication service, the service manager is configured to reject the start request.

11. The management apparatus according to claim 2, wherein
the predetermined processing includes processing of transmitting the start request to the quality control system of the communication carrier.

12. The management apparatus according to claim 11, wherein
the predetermined processing includes processing of transmitting the terminal information to the quality control system of the communication carrier.

13. The management apparatus according to claim 2, wherein
the predetermined processing includes processing of transmitting, to the terminal apparatus, information necessary for the terminal apparatus to request the quality control system of the communication carrier, to control the quality of the communication service.

* * * * *